United States Patent

[11] 3,633,438

[72] Inventors Toshiaki Akamatsu
 Okazaki-shi;
 Shou Honda, Toyota-shi, both of Japan
[21] Appl. No. 3,892
[22] Filed Jan. 19, 1970
[45] Patented Jan. 11, 1972
[73] Assignee Toyota Jisosha Kigyo Kabushiki Kaisha
 Toyota-cho, Toyota-shi, Aichi-ken, Japan
[32] Priority Jan. 23, 1969
[33] Japan
[31] 44/4402

[54] STEERING GEAR
 6 Claims, 11 Drawing Figs.
[52] U.S. Cl. ............................................ 74/500
[51] Int. Cl. ............................................ B62d 3/10
[50] Field of Search ............................................ 74/500,
 499, 498, 497, 496, 409, 440, 441; 280/96

[56] References Cited
 UNITED STATES PATENTS
 2,441,168 5/1948 Richardson ................ 74/441 X
 2,486,510 11/1949 Walters ...................... 74/500
 2,547,784 4/1951 Saives ........................ 74/497
 2,975,652 3/1961 Bishop ........................ 74/500
 FOREIGN PATENTS
 699,856 12/1964 Canada ....................... 74/498
 235,298 6/1925 Great Britain ............... 74/500

Primary Examiner—Milton Kaufman
Attorney—McGlew and Toren

ABSTRACT: A steering gear includes an hourglass worm fixed to rotate with a steering wheel shaft, and a sector shaft mounting a roller shaft rotatably supporting a toothed roller in engagement with the worm. The roller shaft supports the roller in engagement with the worm with at least one pair of contact points, between the tooth surfaces of the roller and the worm, and which contact points are symmetrical with respect to a diametric plane through the center of the worm, located substantially in a plane including the axis of the roller shaft when the roller is in a neutral position relative to the worm. The contact points are at the extreme outer tooth surfaces of the roller. The roller setting angle differs from the worm lead angle at the neutral, or straight line driving, position of the worm.

INVENTORS
TOSHIAKI AKAMATSU
SHOU HONDA

BY McGlew and Toren

ATTORNEYS

STEERING GEAR

BACKGROUND OF THE INVENTION

In order to improve such performance characteristics of automotive vehicles as traveling stability, feel of the steering wheel, etc., steering gears of conventional types are so designed as to eliminate backlash of tooth surfaces at the neutral position of the steering wheel. Furthermore, a few degrees of preloading are provided. Thereby the feel of the steering wheel, in the neutral position, and the traveling stability of the automotive vehicle, are enhanced. Additionally, and in order to prevent rugged movement of the steering wheel being caused by manufacturing or assembly errors, a few degrees of backlash are introduced as the angle of rotation of the steering wheel, from the neutral position, increases.

Several methods have been proposed for satisfying these requirements, or to provide an optimum backlash curve for steering gears. One procedure is to displace the generating center line of the worm from the assembly centerline of the worm, when performing gear cutting of hourglass worms. Another procedure is to adjust the shimming of the worm during assembly of the steering gear. However, these methods are very complicated and require great skill and long experience for proper performance.

Especially, in known procedures, the setting angle of the roller with respect to the worm axis is made to agree with the lead angle of the worm, and thus symmetrical backlash for the rotation of the steering wheel in either direction from neutral is not introduced, which causes undesirably peculiar operation of the steering wheel. Additionally, the contact conditions between the worm and the roller, for right-hand rotation of the steering wheel, are quite different from those for left-hand rotation of the steering wheel. Most importantly, in the case where the outer tooth surface of the roller comes in contact with a thin tooth at an end of the worm, this thin worm tooth may easily be broken.

SUMMARY OF THE INVENTION

This invention relates to steering gears for automotive vehicles and, more particularly, to a novel and improved steering gear capable of simple manufacture and assembly, not requiring complicated or highly skilled gear cutting or assembly, and having a desired backlash characteristic curve.

In a steering gear embodying the invention, no backlash is introduced when the steering wheel is in the neutral position, regardless of a few degrees of manufacturing and assembly errors, thus ensuring prompt response to rotation of the steering wheel. In addition, symmetrical backlash, during rotation of the steering wheel in either direction from neutral, is introduced by the selection of an optimum setting angle of a tooth roller relative to the axis of an hourglass worm with which it is engaged, thus providing for ideal operation of the steering gear.

For these objects, a steering gear, in accordance with the present invention, includes an hourglass worm fixed to rotate with the steering wheel shaft, and a sector shaft rotatably supporting a toothed roller in engagement with the worm. The roller is supported by the sector shaft in such a manner that the point of contact of the worm with the extreme outer tooth surface of the roller falls in a plane including the axis of the roller.

In order to eliminate backlash in the neutral position, the worm and the roller are arranged to contact with each other by preloading at their respective surfaces of action, which are symmetrical with respect to the neutral line and are closest to the latter, in a certain range of rotation of the sector, for example, in the range of 10° in either direction from neutral. In this manner, it is possible to provide the steering gear with a backlash curve characteristic which is nearly symmetrical for rotation of the steering wheel in either direction from the neutral position. In case the rotation angle of the sector is larger than the mentioned range, it is advisable to contact a tooth of the worm with the outer surface of a roller tooth which is nearer to the neutral position, in order to ensure adequate strength of the roller.

An object of the invention is to provide an automotive vehicle steering gear capable of simple manufacture and not involving complicated operations or high skill in gear cutting or assembly.

Another object of the invention is to provide such a steering gear which has a desired backlash curve characteristic.

A further object of the invention is to provide such a steering gear in which there is no backlash when the steering wheel is in the neutral position, and irrespective of a few degrees of manufacturing and assembling errors.

Another object of the invention is to provide such a steering gear in which symmetrical backlash is introduced, during rotation of the steering gear in either direction from neutral, by the selection of an optimum setting angle of a tooth roller relative to a worm axis.

For an understanding of the principles of the invention, reference is made to the following description of typical embodiments thereof as illustrated in the accompanying drawings.

DESCRIPTION OF THE PREFERRED EMBODIMENTS

Figure 1:
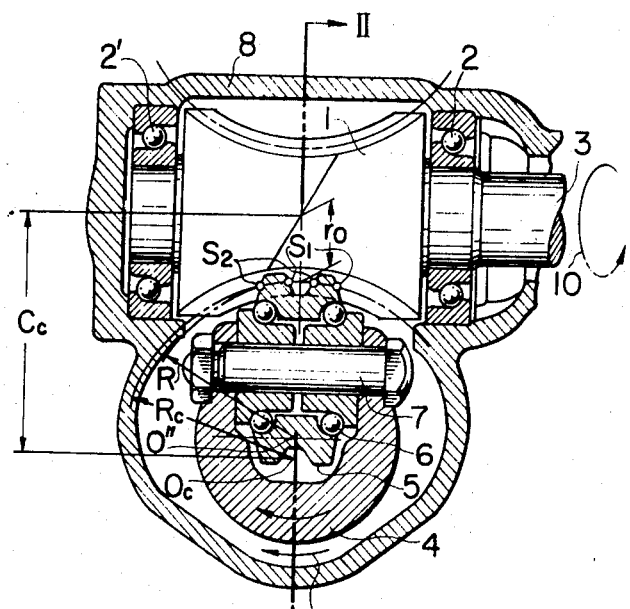
FIG. 1 is a sectional view of a steering gear, embodying the invention, taken longitudinally of a steering wheel shaft along the line I—I of FIG. 2.
Figure 2:
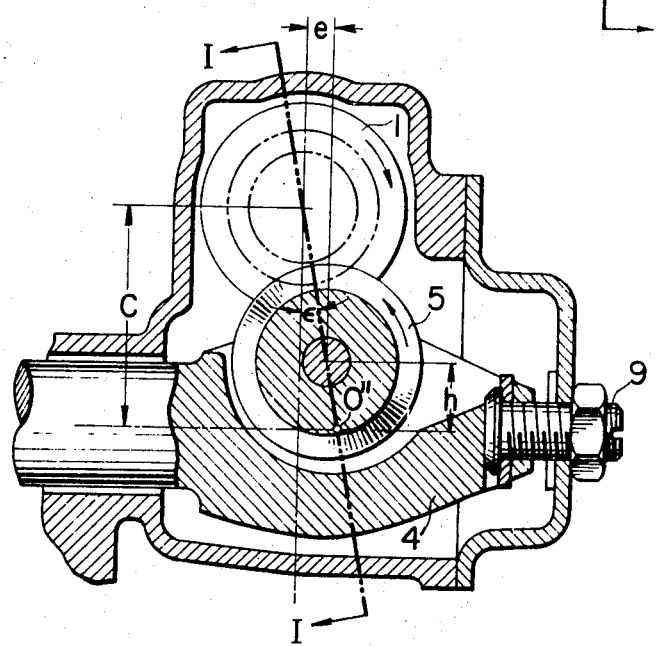
FIG. 2 is a sectional view taken along the line II—II of FIG. 1.

Referring first to FIGS. 1 and 2, an hourglass worm 1 is rotatably supported by bearings 2 and 2' within a gear box 8. Worm 1 is at one end of a steering wheel shaft 3, and is either integral with the shaft 3 or is fixed to rotate therewith. A sector shaft 4 rotatably supports a two-tooth roller 5 by means of bearings 6 and a shaft or pin 7, roller 5 meshing with worm 1.

In FIG. 1, O'' is a point of the axis of sector shaft 4. The point of contact between a tooth of worm 1 and a tooth of roller 5 is positioned on a radius of rotation R, of sector 4, the radius R having its center at the point O''. On the other hand, the generating radius Rc of worm 1 is larger than radius R, and its center is positioned at the point Oc. The distance between the axis of worm 1 and the generating center Oc is indicated by the dimension Cc, and the minimum radius of worm 1 is indicated at $r_o$.

As will be clear from FIG. 2, the center of axis of roller 5 is offset from the center of axis of worm 1 by the distance e. The line connecting these centers of axes, which is the line I—I in FIG. 2, and a line perpendicular to the axis of worm 1 and to the axis of sector 4, form an angle of inclination $\epsilon$. Offset e makes it possible to readjust backlash with respect to wear of the tooth surfaces, and such readjustment is effected by means of an adjusting screw 9. The distance between the axis of roller 5 and the axis of sector shaft 4 is indicated at h, and the distance between the axis of worm 1 and that of sector shaft 4 is indicated at C.

Although the inclination of roller 5 is not clearly illustrated in FIGS. 1 and 2, the roller is installed in a position inclined in accordance with a lead angle ω, as shown in FIG. 3, of the teeth of worm 1. Consequently, it should be understood that the axis of roller 5 is not perpendicular to the surface of the paper on which FIG. 2 is drawn.

If the teeth of worm 1 form a left-hand thread, roller 5 is rotated clockwise around the shaft bolt or pin 7 when steering wheel shaft 3 is rotated counterclockwise in the direction of the arrow 10 of FIG. 1. At the same time, roller 5 is pushed toward the right, as viewed in FIG. 1, due to the torsional moment of worm 1, and rotates sector shaft 4 clockwise in the direction of the arrow 11 of FIG. 1. The engagement of worm 1 with roller 5 is explained hereinafter in greater detail.

Figure 3A:
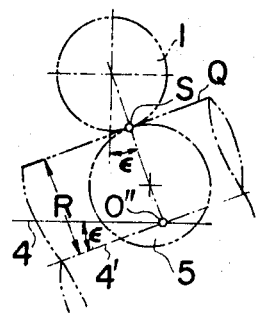
FIG. 3a is a simplified schematic view corresponding to FIG. 2.

In FIG. 3a, if sector shaft 4 is rotated through an angle $\theta$, the movement of the contact point S of worm 1 with roller 5 corresponds to a rotation by an angle of $\theta i = \theta \cos \epsilon$, around a line 4'. Line 4' constitutes the axis of a cylindrical surface Q extending through the point S. Line 4' is a line which intersects at point O'' but is inclined by an angle $\epsilon$ with respect to sector shaft 4 and within the plane II–II.

Figure 3B:
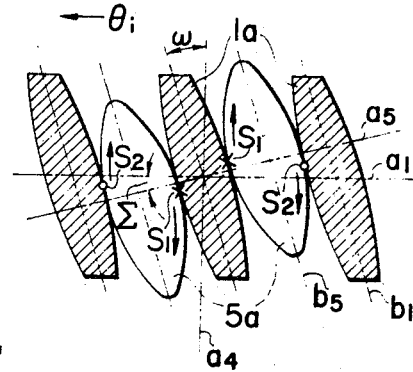
FIG. 3b is a development of the cylindrical surface shown in FIG. 3a when viewed from the outside of the cylinder toward its center, and illustrating the cross sections of the teeth of the hourglass worm and the toothed roller.

FIG. 3b is a development of the surfaces of teeth 1a of worm 1 and teeth 5a of roller 5, as cut by cylindrical surface Q. The axis of worm 1 is indicated as $a_1$, the axis of cylindrical surface Q, which is the line 4' of FIG. 3a, is indicated as $a_4$, and the axis of roller 5 is indicated as $a_5$ and in inclined by an angle $\Sigma$ with respect to axis $a_1$ of worm 1. However, angle $\Sigma$ increases with respect to axis $a_1$ of worm 1 as the angle of rotation $\theta i$ of contact point S is increased. This relationship is defined by the following equation:

$$\Sigma = \tan \epsilon \cdot \sin \theta i + \Sigma o.$$

In this equation $\Sigma o$ is the setting angle of roller 5 in the neutral position, or at the time when the angle of rotation of sector 4 is zero.

In FIG. 3b, the worm teeth 1a and the roller teeth 5a are illustrated as engaged in the neutral position. The inclination of axis $a_5$ increases as the angle of rotation $\theta i$ increases from zero in the direction of the arrow. With such increase, two contact points $S_1$ of the inner surfaces of roller teeth 5a move in opposite directions as illustrated by the arrows. Also, two contact points $S_2$ of the outer surfaces of teeth 5a move in opposite directions as illustrated by the respective arrows, the contact points $S_2$ each moving in a direction opposite to the direction of movement of the nearer contact point $S_1$. When rotation angle $\theta i$ is changed in the opposite direction, the respective direction of movement of each contact point also is in the opposite direction to that illustrated by the associated arrows.

In the drawings, the roller setting angle $\Sigma o$ is taken as equal to the lead angle ω of worm teeth 1a. In this case, a pair of contact points $S_1$ or $S_2$ do not fall in a plane including roller axis $a_5$, but are respectively positioned on lines inclined by a certain angle relative thereto. If the setting angle $\Sigma o$ of roller 5 in the neutral position is appropriately adjusted, and a pair of contact points $S_1$ or $S_2$ are positioned in a plane including roller axis $a_5$, it will be apparent that contact points $S_1$ or $S_2$ are moved symmetrically, relative to the left and right directions of change of the angle of rotation $\theta i$, or the sector rotation angle $\theta$.

Generally, the tooth surfaces of worm 1 and roller 5 are independently generated. Consequently, it is impossible simultaneously to position contact points $S_1$ and $S_2$ in a plane including the axis of roller 5. In other words, the optimum setting angle of contact points $S_1$ is different from that of contact points $S_2$. The movement of contact points $S_1$, due to change in sector rotation angle $\theta$, is, however, negligibly smaller than that of contact points $S_2$, and is not influenced by variation of the setting angle. Therefore, the optimum setting angle of roller 5 is determined substantially by taking the contact point of the extreme outer tooth surface of roller 5 with the worm as a reference point. In the case of the preferred embodiment, a contact point $S_2$ is taken as a reference point.

The optimum roller-setting angle $\Sigma o$ can be determined by the following calculation formulas.

TABLE 1

Calculation Formulas for Determining the Optimum Roller-setting Angle (1) $$\Delta \theta = \frac{Pa \pm \frac{taw}{2}}{Rc}$$

(Positive in the case of 3-tooth roller. Negative in the case of 2-tooth roller)

2. $r = Cc - Rc \cdot \cos(\Delta \theta)$
3. $Vc/V_1 = (Rc/Nc) \cdot (1/r)$ (Positive when worm teeth are left hand)
4. $D = (C-h) \sec \epsilon - r$
5. $A = (ta_2/2) + (D + r - r_o) \tan \tau_2$
6. Select $\Sigma o$ (setting angle of roller) appropriately (Positive when worm teeth are left hand)
7. $a = (A - D \tan \tau_2) \sin \Sigma o$
8. $\beta' = \sin^{-1}(a/r)$ (9) $$\tan \beta = \frac{\sin \beta' + \frac{Vc}{V_1} \cdot \sin(\Delta \theta)}{\cos \beta'}$$

10. $\tan \lambda = Vc/V_1 \cos(\Delta \theta)$

(11) $$\tan \gamma_1 = \frac{(A \sin \Sigma o - a)(\cot \Sigma o + \tan \Sigma o)}{D}$$

(12) $$\tan \lambda_1 = \frac{\tan \lambda - \sin \beta \cdot \tan \gamma_1}{\cos \beta}$$

By repeated calculations using the formulas 6 through 12, it is possible to determine the value of $\Sigma o$ required to make $\lambda_2 = \Sigma o$. In the above formulas:

$Rc$: Generating radius (FIG. 1)
$Cc$: Generating center distance (FIG. 1)
$Nc$: Number of teeth of cutter
$C$: Assembling center distance (FIG. 2)
$h$: Height of roller shaft (FIG. 2)
$\epsilon$: Offset angle (FIG. 2)
$R$: Radius of rotation (FIG. 1)
$ro$: Minimum radius of worm (FIG. 1)

Figure 8A:
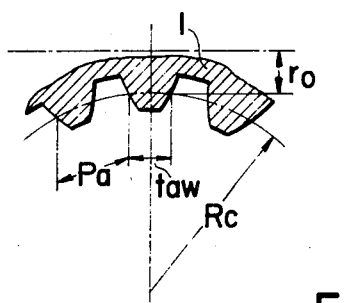
FIGS. 8a–8c are sectional views illustrating certain parameters of a worm and a toothed roller.
Figure 8B:
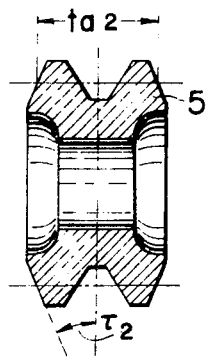

$Pa$ and $taw$ are, respectively, the tooth pitch and the tooth width of worm 1, and are expressed in terms of arc length, as shown in FIG. 8a. $ta_2$ and $\tau_2$ are the factors in the two-tooth roller shown in FIG. 8b and in the three-tooth roller shown in FIG. 8c.

Figure 4:
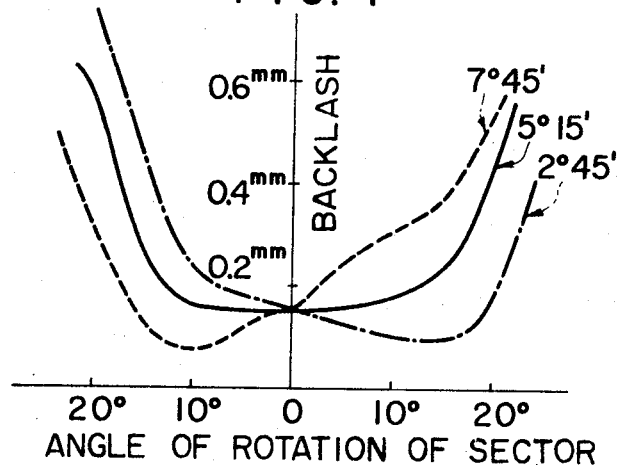
FIGS. 4 and 5 are graphic illustrations of the curve of the backlash, between the worm and the roller, relative to the angle of rotation of a sector, and for which the parameter is the setting angle of the roller.

FIG. 4 graphically illustrates the experimentally confirmed results with respect to determining the optimum roller-setting angle. In these experiments, a steering gear having 7°30' of worm lead angle and 5.5 mm. of offset was used, other factors being omitted. The roller was installed at 5°15', which is the optimum setting angle obtained from the calculation formulas of table 1, and at angles different from the optimum setting angle by ±2°30'. The backlash was actually measured for each case. The steering gear used in the experiments was one in which the roller teeth had their outer surfaces in contact with the worm teeth, as shown by the contact points $S_2$ in FIG. 3b. In this steering gear, a few degrees of backlash occur in the neutral position when the sector rotation is zero, and a symmetrical backlash curve is obtained in the case when the roller is installed at the optimum setting angle of 5°15'. On the other hand, two curves determined in the case of setting angles deviating from the optimum setting angle are not symmetrical, and show characteristics which are not satisfactory from the practical standpoint.

Referring again to FIG. 3b, it is apparent that the two points $S_1$, wherein worm teeth 1a contact the inner surfaces of roller teeth 5a, are moved to a small extent for variations in angle $\Sigma$. This means that these contact points are relatively insensitive to manufacturing or assembly errors of component parts. If the worm teeth are preloaded to contact the inner surfaces of the roller teeth, almost ideal characteristics are obtained in spite of certain degrees of deviation due to manufacturing or assembly inaccuracies.

Figure 5:
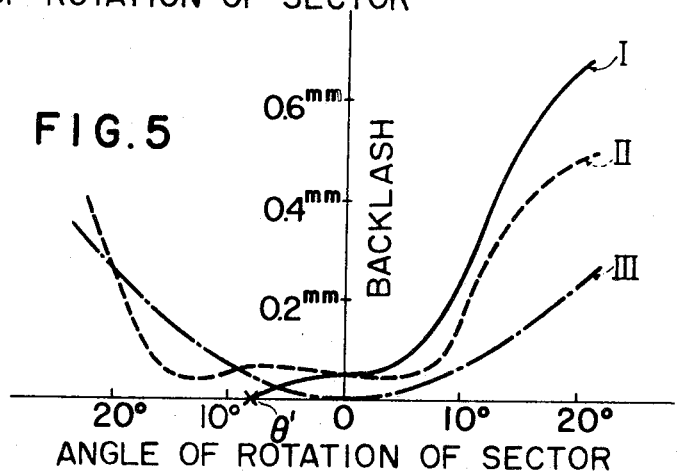

If roller 5 is supported at the optimum setting angle, as shown in the backlash curve III of FIG. 5, and if the worm contacts the inner surfaces of the teeth of the roller in the neutral position, the backlash is completely eliminated in spite of a few degrees of manufacturing errors. Thus, a steering gear providing accurate response to rotation of a steering wheel can be provided. On the other hand, if decrease of the backlash is effected in the manner suggested by the prior art, by making the setting angle of the roller agree with the lead angle of the worm at its center portion, and by contacting the worm with the outer tooth surfaces of the roller, the inappropriate setting angle will exert a great influence and consequently no rotation will be effected at a certain sector rotation angle $\theta'$, as shown by the curve I of FIG. 5.

Figure 6:
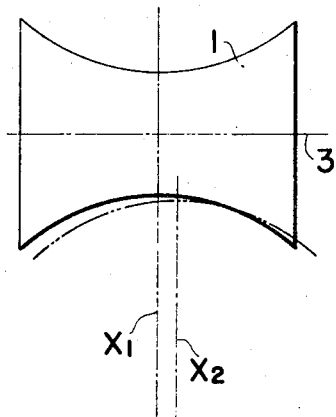
FIG. 6 is a somewhat schematic elevation view illustrating how the assembly centerline of an hourglass worm is displaced from the generating centerline.

In order to obviate this drawback, it was necessary, in prior art procedures, to cut the gear teeth in the worm by displacing the generating centerline $X_2$ from the assembly centerline $X_1$, as shown in FIG. 6. In this case, manufacturing errors have a great influence, and therefore not better backlash curve than that shown by the curve II of FIG. 5 can be obtained. Furthermore, since neither the direction nor the amount of displacement of the generating centerline is definite, a high degree of skill is required.

Figure 7:
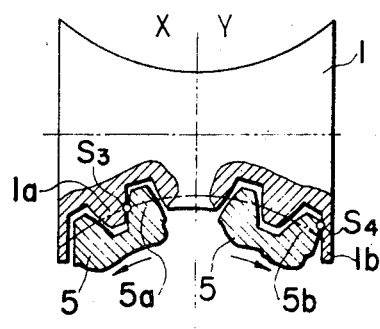
FIG. 7 illustrates the tooth contact conditions in a conventional steering gear.

In a steering gear wherein the optimum roller-setting angle is not taken into consideration, a tooth $5a$ of roller 5 contacts with a tooth $1a$ of worm 1 at a point $S_3$ toward the X-side of FIG. 7. At the Y-side of FIG. 7, however, a tooth $5b$ of roller 5 contacts with an extreme outer tooth $1b$ of worm 1 at a point $S_4$, and worm tooth $1b$ may be broken, depending upon the magnitude of the torque. In accordance with the present invention, the contact of the worm with the roller can be made symmetrical, and therefore it is always possible to make an adjustment so that contact occurs at the point $S_3$, for rotation in either direction. Thus, the present invention provides a safe steering gear wherein no tooth breakage is likely to occur.

Figure 8C:
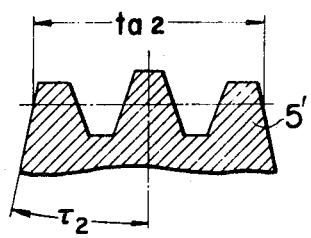

The basic inventive concepts underlying the present invention may be summarized as follows:

1. If at least one pair of contact points between worm teeth and roller teeth in the neutral position, which contact points are symmetrical with respect to a diametric plane passing through the center of the worm, are adapted to fall in a plane including the roller axis, the backlash curve of such a steering gear will become symmetrical for rotation in either direction. In other words, there is an optimum roller-setting angle.
2. In the case of a two-tooth roller, such as shown in FIG. 1, FIG. 3b, an engagement relatively free from the influence of manufacturing or assembly errors can be provided by making a worm tooth, on the neutral line, to contact with two inner surfaces of adjacent roller teeth by preloading, thus eliminating backlash in the neutral position. Consequently, it is evident that, in the case of a three-tooth roller, such as shown in FIG. 8c, both sides of the central roller tooth on the neutral line should be contacted with the inner surfaces of two corresponding worm teeth, by preloading. In short, two surfaces of action which are nearest to and symmetrical with respect to the neutral line should be made to contact by preloading.
3. As in prior art procedures, the generating radius $Rc$ is made slightly larger than the radius of rotation $R$, in order to increase backlash as the sector rotation angle $\theta$ increases in either direction, as shown in FIGS. 4 and 5. By so doing, the tooth pitch, or the space interval, of the worm are increased, thus providing desired backlash.

While specific embodiments of the invention have been shown and described in detail to illustrate the application of the principles of the invention, it will be understood that the invention may be embodied otherwise without departing from such principles.

What is claimed is:

1. In a steering gear of the type including an hourglass worm fixed to rotate with a steering wheel shaft, and a sector shaft rotatably supporting a toothed roller in engagement with the worm, the improvement comprising, in combination, said sector shaft supporting said roller in engagement with said worm with at least one pair of contact points between tooth surfaces of said roller and said worm, which contact points are symmetrical with respect to a diametric plane through the center of said worm, located substantially in a plane including the axis of said roller when said roller is in a neutral position relative to said worm; the setting angle of said roller differing from the lead angle of said worm, in the neutral position of said worm, by an amount sufficient to provide symmetrical backlash in both directions of rotation of said worm.

2. In a steering gear, the improvement claimed in claim 1, in which said worm and said roller are preloaded so that, in the neutral position, they are in contact at two surfaces of action which are symmetrical with respect to the centerline of the roller and are nearest to the centerline of the roller.

3. In a steering gear, the improvement claimed in claim 2, in which each surface of action includes an inner surface of a roller tooth.

4. In a steering gear, the improvement claimed in claim 3, in which said roller is a two-tooth roller and said surfaces of action include facing surfaces of adjacent roller teeth.

5. In a steering gear, the improvement claimed in claim 1, in which the generating radius of said hourglass worm is larger than the rotation radius of said sector shaft.

6. In a steering gear of the type including an hourglass worm fixed to rotate with a steering wheel shaft, and a sector shaft rotatably supporting a toothed roller in engagement with the worm, the improvement comprising, in combination, said sector shaft supporting said roller in engagement with said worm with at least one pair of contact points between tooth surfaces of said roller and said worm, which contact points are symmetrical with respect to a diametric plane through the center of said worm, located substantially in a plane including the axis of said roller when said roller is in a neutral position relative to said worm; said worm and said roller being preloaded so that, in the neutral position, they are are in contact at two surfaces of action which are symmetrical with respect to the centerline of the roller and nearest to the centerline of the roller; each surface of action including an inner surface of a roller tooth; said roller being a three-tooth roller and said surfaces of action including opposite surfaces of the intermediate roller tooth.

* * * * *